(12) United States Patent
Park et al.

(10) Patent No.: US 10,974,654 B2
(45) Date of Patent: Apr. 13, 2021

(54) SIDE SHUTTER RECEIVING TYPE CARGO SCREEN UNIT AND VEHICLE INCLUDING THE SAME

(71) Applicants: HYUNDAI MOTOR COMPANY, Seoul (KR); KIA MOTORS CORPORATION, Seoul (KR)

(72) Inventors: Hee-Sang Park, Seoul (KR); Won-Jong Lee, Suwon-si (KR); Chang-Mo Seong, Suwon-si (KR); Tae-Wook Ryu, Seoul (KR); Seung-Soo Ryu, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 160 days.

(21) Appl. No.: 16/452,098

(22) Filed: Jun. 25, 2019

(65) Prior Publication Data

US 2020/0156550 A1 May 21, 2020

(30) Foreign Application Priority Data

Nov. 19, 2018 (KR) .......................... 10-2018-0142841

(51) Int. Cl.
*B60R 5/04* (2006.01)
*E05D 15/16* (2006.01)
*B62D 25/08* (2006.01)

(52) U.S. Cl.
CPC .............. *B60R 5/047* (2013.01); *B60R 5/044* (2013.01); *B62D 25/087* (2013.01); *E05D 15/165* (2013.01); *E05Y 2900/538* (2013.01)

(58) Field of Classification Search
CPC .......... B60R 5/04; B60R 5/044; B60R 5/045; B60R 5/047; B62D 25/02; B62D 25/087
USPC ................... 296/1.08, 37.16, 100.11, 136.03
See application file for complete search history.

(56) References Cited

U.S. PATENT DOCUMENTS

| 6,039,105 | A | * | 3/2000 | Patmore | B60R 5/047 160/121.1 |
|---|---|---|---|---|---|
| 6,125,908 | A | * | 10/2000 | Ament | B60R 5/047 160/323.1 |
| 6,213,186 | B1 | * | 4/2001 | Torres | B60J 1/2038 160/24 |
| 2004/0160075 | A1 | * | 8/2004 | Ehrenberger | B60R 5/047 296/37.1 |
| 2009/0195006 | A1 | * | 8/2009 | Lim | B60R 5/047 296/3 |
| 2013/0147225 | A1 | * | 6/2013 | Nedelman | B60R 5/047 296/37.16 |

FOREIGN PATENT DOCUMENTS

KR         10-1198836 B1      11/2012

* cited by examiner

*Primary Examiner* — Jason S Daniels
(74) *Attorney, Agent, or Firm* — Morgan, Lewis & Bockius LLP

(57) ABSTRACT

A cargo screen unit includes: a cargo screen having a cover sheet rolled out from a rolled-in and wound state so as to cover a cargo; and a parcel tray having an inner space for receiving an edge portion of the cargo screen, and having a receiving shutter, which communicates the inner space and an outer space by a downward movement and blocks the inner space and the outer space by an upward movement.

19 Claims, 15 Drawing Sheets

SIDE SHUTTER RECEIVING TYPE CARGO SCREEN UNIT AND VEHICLE INCLUDING THE SAME

CROSS-REFERENCE TO RELATED APPLICATION

This application claims priority to Korean Patent Application No. 10-2018-0142841, filed on Nov. 19, 2018 in the Korean Intellectual Property Office, which is incorporated herein by reference in its entirety.

TECHNICAL FIELD

The present disclosure relates to a cargo screen, and more particularly, to a side shutter receiving type cargo screen unit for a cargo screen capable of being applied without a receiving structure restriction.

BACKGROUND

A vehicle, in particular, a leisure vehicle, is equipped with a cargo screen in a trunk. Such a cargo screen generally has a detachable and attachable structure connected to a parcel tray in a space behind a wheelhouse (i.e., a space between the left and right wheel houses and a rear door). The parcel tray refers to a space for receiving a tool, a jack, and the like.

For example, in the cargo screen, a cover sheet for covering the cargo space inside the trunk is rolled-in by using a roller assembly, and the left and right end portions (i.e., left and right edge portions) of roller bars constituting the roller assembly are stored (i.e., fitted and fixed) in the parcel tray space covered by a luggage side trim, such that the cover sheet can be fixed in a rolled-out state when the cargo screen is being used.

Therefore, the cargo screen is in a detachable and attachable structure connected to the parcel tray so that items inside the trunk may not be seen from the outside by the cover sheet that has been rolled-out from a fixed state. In addition, the cover sheet can bring aesthetic improvement to the cargo space of the trunk opened in communication with a rear seat.

The contents described above are to help the understanding of the background of the present disclosure, and may include what is not previously known to those skilled in the art to which the present disclosure pertains.

SUMMARY OF THE DISCLOSURE

Although cargo screens per se are known, the detachable and attachable structure of a cargo screen and a parcel tray is required to have the following structural improvements.

Firstly, the cargo screen may increase the usability for the trunk top space, but the width of the cargo screen is formed to be greater than the width of the seat (i.e., the rear seat row), such that both left and right portions of the cargo screen should be stored in the additional space occupying the parcel tray space in the space behind the wheel house.

Secondly, the parcel tray space is disposed in a narrow space at further outside than the width of the seat on the trunk inner layout, such that the upper end portion of the tray of the luggage side trim covering the parcel tray space when using the cargo screen should be removed.

Thirdly, the removal of the upper tray leads to exposure to the edge portions of the cargo screen (i.e., the left and right end portions of the roller bar), thereby resulting in poor appearance.

Fourthly, when using the cargo screen, it is possible to improve the appearance quality by covering the upper space of the parcel tray with the upper tray removed by the upper cover, but the structural change for the upper cover assembly space is required, such that the size of the receiving inlet of the parcel tray should be reduced.

Fifthly, the reduction of the size of the receiving inlet requires a separate holder (i.e., fixture) for fixing jacks and tools while narrowing the width of the receiving inlet, such that it is difficult to assemble the jacks and the tools having relatively large width compared to the width of the receiving inlet. In particular, the assembly process is difficult because an operator needs to pay considerable attention in order to prevent poor appearance caused by the scratches generated on the surface of the luggage side trim, which has been assembled by the surface scratches due to the sharp edges of tool and jack resulting from careless handling during the assembly of heavy tools and jacks.

Sixthly, the excessive attention of the operator, which makes it difficult to assemble, causes forcible or impulsive assembly, thereby increasing defects reducing the merchantability.

Therefore, an object of the present disclosure is to provide a side shutter receiving type cargo screen unit and a vehicle including the same, having a vertically movable shutter structure for opening and closing an inner space to a side surface portion of a parcel tray, thereby preventing the reduction in the aesthetic appearance due to an external exposure even when using a luggage tray to increase the usability for a trunk space while facilitating receiving of an edge portion of a cargo screen having a width greater than that of a rear seat. In particular, disassembly of a luggage side trim is not required and the size of an inlet of a receiving box for receiving the cargo screen can be reduced, and further, the cargo screen can be adjusted according to the size of a luggage by moving a receiving position of the cargo screen along a side surface of the parcel tray.

A cargo screen unit according to an exemplary embodiment of the present disclosure includes: a cargo screen having a cover sheet rolled out from a rolled-in and wound state so as to cover a cargo; and a parcel tray having an inner space for receiving an edge portion of the cargo screen, and having a receiving shutter, which communicates the inner space and an outer space by a downward movement and blocks the inner space and the outer space by an upward movement.

The receiving shutter is provided on the side surface of the parcel tray.

The parcel tray includes a receiving box formed as the inner space, a receiving cover coupled to the upper portion of the receiving box to cover the upper surface of the inner space, and a luggage side wall coupled to the side surface of the receiving box to cover the side surface of the inner space, and having the receiving shutter.

The receiving shutter communicates the inner space and the outer space by opening the receiving shutter window of the luggage side wall, while blocks the inner space and the outer space by covering the receiving shutter window.

The coupling structure of the luggage side wall and the receiving shutter is composed of a guide channel formed on a receiving shutter guide protruded from the left and right edge portions of the receiving shutter window on the luggage side wall, and a guide flange of the receiving shutter.

The guide channel forms an inclined protrusion, the guide flange forms a descending position groove engaged with the inclined protrusion in an uneven structure together with an inclined surface end in surface contact with the inclined protrusion at an acute angle.

The inclined protrusion and the inclined surface end maintain the receiving shutter in a state where the inner space and the outer space have been blocked after the upward movement, and the descending position groove maintains the receiving shutter in a state where the inner space and the outer space have been communicated after the downward movement by engaging with the inclined protrusion.

The receiving shutter has a side flange, and the side flange is protruded from the guide flange to be in close contact with the receiving shutter guide.

The receiving box and the receiving cover are attached to and detached from a cover hook, and the cover hook is composed of a hook groove of the receiving box and a cover fixer of the receiving cover; and the receiving box and the luggage side wall are attached to and detached from a luggage side hook, and the luggage side hook is composed of a hook groove of the receiving box and a wall fixer of the luggage side wall.

The receiving cover has a grip member, and the grip member may grip and pull the receiving cover so that the receiving cover is detached from the receiving box.

The luggage side wall has a rib in a lattice structure to reinforce the stiffness thereof.

The inner space has a cargo screen holder or a cargo screen rail holder, and the cargo screen holder or the cargo screen rail holder fits the edge portion of the cargo screen on the upper portion of the receiving equipment received in the inner space to fix the cargo screen thereto.

The cargo screen holder is formed in a recessed groove, and the cargo screen rail holder is formed in a rail groove along the longitudinal direction of the parcel tray so that the position movement of the cargo screen is possible.

A vehicle according to another exemplary embodiment of the present disclosure includes: a parcel tray including a receiving box formed as an inner space for receiving an edge portion of a cargo screen having a cover sheet rolled out from a rolled-in and wound state to cover a cargo, a receiving cover coupled to an upper portion of the receiving box to cover an upper surface of the inner space, a luggage side wall coupled to a side surface of the receiving box to cover a side surface of the inner space, and a receiving shutter coupled to the luggage side wall to be operated in a vertical movement type shutter manner that opens and closes the inner space; and a trunk for forming the parcel tray as a pair of a left parcel tray and a right parcel tray, and arranging the left parcel tray as a left additional space of a left side of a cargo space and the right parcel tray as a right additional space of a right side of the cargo space.

The left addition space is formed as a left vehicle body outer trim panel connected to the rear of a left wheelhouse, and the right addition space is formed as a right vehicle body outer trim panel connected to the rear of a right wheelhouse.

Each of the left vehicle body outer trim panel and the right vehicle body outer trim panel is formed in an integrated structure forming the receiving box, and the integrated structure forms the inner space as a parcel tray space.

The left wheelhouse and the left vehicle body outer trim panel are added to a left luggage side trim, and the right wheelhouse and the right vehicle body outer trim panel are added to a right luggage side trim, and each of the left luggage side trim and the right luggage side trim is formed in an integrated structure forming the luggage side wall.

The inner space receives a receiving equipment, and the receiving equipment comprises a jack. A luggage tray is interposed between the left additional space and the right additional space, and the luggage tray is received in the parcel tray to cover the cargo screen covering a cargo.

The cargo screen unit applied to the vehicle of the present disclosure implements the following operations and effects by applying the side shutter receiving method to the receiving of the parcel tray of the cargo screen.

Firstly, it is possible to mount the cargo screen in a state where the tool and the jack have been received by using the parcel tray space applied to the space behind the wheelhouse. Secondly, it is possible to implement a structure capable of detaching the tool and the jack when detaching the receiving cover from the upper portion of the parcel tray, and detaching the cargo screen. Thirdly, it is possible to prevent the vehicle body from being seen through the hole by the receiving cover around the luggage side trim on the upper portion of the parcel tray, when the cargo screen is not received therein (i.e., the separation of the cargo screen). Fourthly, it is possible to prevent the appearance quality with respect to the upper space of the parcel tray receiving the cargo screen from being reduced and not to require a structural change such as reducing the size of the receiving inlet for receiving the tool and the jack because the structural change is not required. Fifthly, it is possible to assemble the luggage side trim after receiving the tool and the jack with respect to the parcel tray, thereby preventing the reduction in merchantability by eliminating defects due to excessive handling care of the operator for preventing the surface scratch of the luggage side trim.

DESCRIPTION OF SPECIFIC EMBODIMENTS

Hereinafter, exemplary embodiments of the present disclosure will be described in detail with reference to the accompanying drawings, and these embodiments are one example and those skilled in the art to which the present disclosure pertains may implement it as various different forms, such that the present disclosure is not limited the embodiments described herein.

Figure 1:
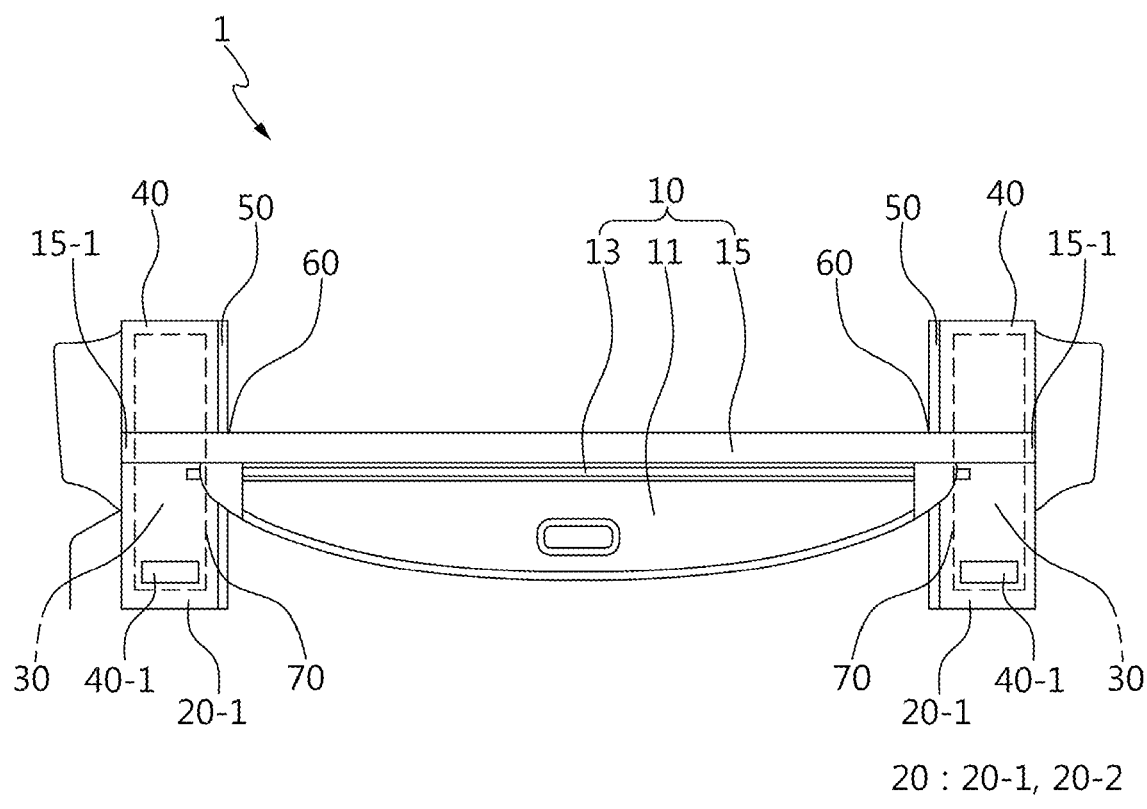
FIG. 1 is an assembly diagram of a side shutter receiving type cargo screen unit in which a cargo screen and a parcel tray being assembled according to an exemplary embodiment the present disclosure.

Referring to FIG. 1, a cargo screen unit 1 includes a cargo screen 10 for covering cargo, and a parcel tray 20 for receiving left and right portions of the cargo screen 10 while forming a receiving space of a receiving equipment 70.

For example, the cargo screen 10 has a width greater than that of a seat, i.e., a rear seat row (see FIG. 8), and both right and left portions thereof are stored by using the parcel tray 20 and switch to the usable state. The cargo screen 10 is composed of a cover sheet 11, a roller assembly 13, and a roller bar 15.

The cover sheet 11 blocks the external exposure of the cargo loaded inside a trunk. The roller assembly 13 is configured so that the cover sheet 11 may be pulled out while receiving in a state of rolling-in and winding the cover sheet 11. The roller bar 15 has roller bar ends 15-1 formed at both left and right edge portions thereof to be stored in the parcel tray 20, such that the cover sheet 11 is fixed in a rolled-out state when using. Therefore, the cargo screen 10 has the same configuration as a conventional cargo screen. However, since the roller bar end 15-1 is connected to the parcel tray 20, the roller bar 15 may have a difference in that the shape thereof may be deformed according to the structure of the parcel tray 20.

For example, the parcel tray 20 includes a receiving box 30 for receiving the receiving equipment 70, a receiving cover 40 for covering the upper portion of the receiving box 30, a luggage side wall 50 for covering the side surface of the receiving box 30, and a receiving shutter for partially opening the side surface of the receiving box 30. The receiving box 30 may be welded and fixed to a vehicle body trim panel (i.e., a vehicle body outer trim panel 110 in FIG. 8) constituting the outer wall of the trunk, and the luggage side wall 50 may be welded and fixed to a luggage trim panel (i.e., a luggage side trim 130 in FIG. 8) added to a wheelhouse part.

In particular, the parcel tray 20 is placed in a space behind the wheelhouse (see FIG. 8) in order to receive both left and right edge portions of the roller bar 15 with the roller bar end 15-1 to be configured in a pair by dividing it into a left parcel tray 20-1 and a right parcel tray 20-2. Therefore, each of the left parcel tray 20-1 and the right parcel tray 20-2 has the same components as the receiving box 30, the receiving cover 40, the luggage side wall 50, and the receiving shutter 60, such that the left parcel tray 20-1 and the right parcel tray 20-2 are merely the names distinguished by the position where the parcel tray 20 is placed.

For example, the receiving equipment 70 is composed of a tool 70-1 such as a driver and a nipple, a jack 70-2 serving as a small lifter for lifting a vehicle body, and a holder 70-3 for receiving the jack 70-2 and binding a tool box for the tool 70-1 with a string.

Figure 2:
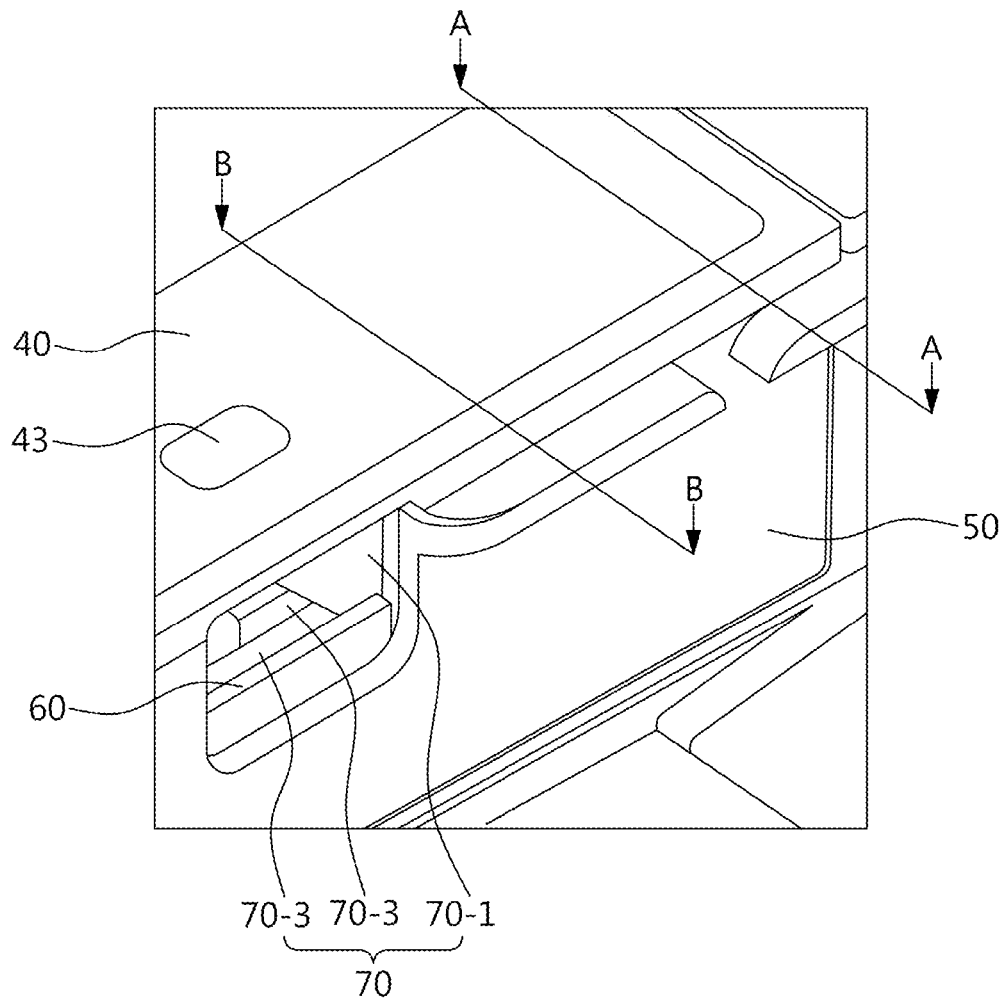
FIG. 2 is a configuration diagram of the parcel tray according to an exemplary embodiment the present disclosure.
Figure 3A:
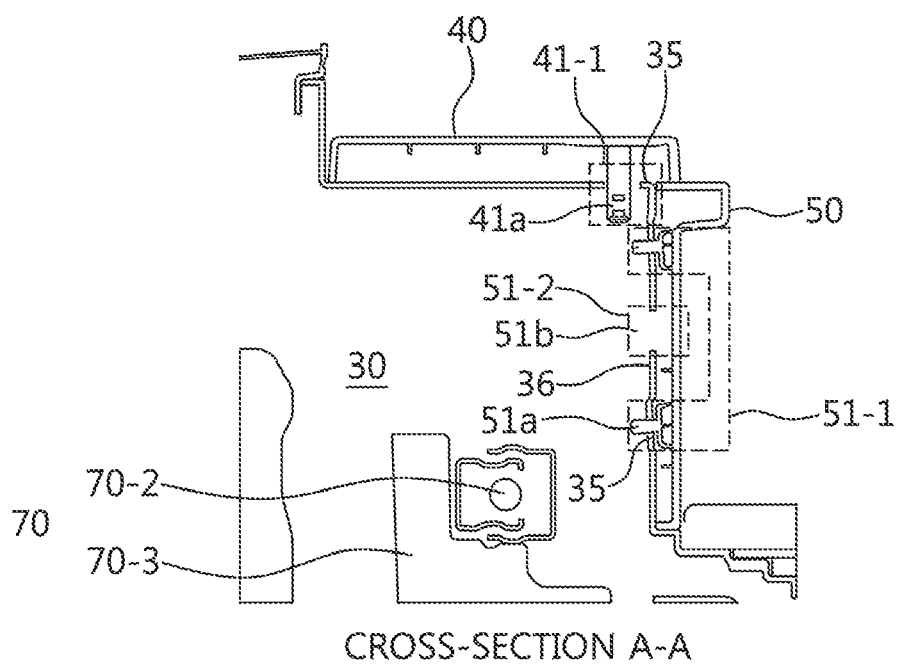
FIGS. 3A and 3B are diagrams illustrating an example of a hook coupling structure applied to a receiving box, a receiving cover, and a luggage side wall constituting the parcel tray according to an exemplary embodiment the present disclosure.
Figure 3B:
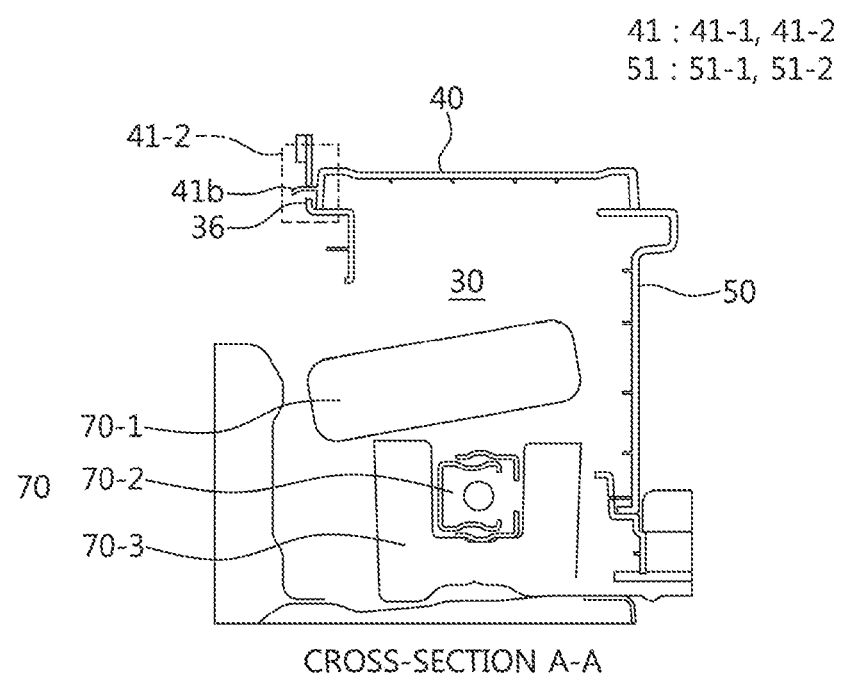

FIGS. 2, 3A, and 3B illustrate a clamp configuration for assembling and separating the receiving box 30, the receiving cover 40, and the luggage side wall 50 constituting the parcel tray 20.

Referring to FIG. 2, the parcel tray 20 is assembled by clamp-coupling the receiving cover 40 to the upper portion of the receiving box 30 and clamp-coupling the luggage side wall 50 to the side surface thereof. Therefore, the parcel tray 20 has the inner space of the receiving box 30 covered with the receiving cover 40 and the luggage side wall 50 in the assembled state.

In particular, the receiving cover 40 has a grip member 43 which releases the clamp coupling by pulling or bending back with a finger so that an opening space where the tool 70-1, the jack 70-2, and the holder 70-3 constituting the receiving equipment 70 enter into the inner space is formed above the receiving box 30. On the other hand, the luggage side wall 50 has a receiving shutter 60, and the receiving shutter 60 is moved downwardly with a finger so that an opening space where the roller bar end 15-1 of the roller bar 15 enters into the inner space is formed on the side surface of the receiving box 30.

Referring to FIGS. 3A and 3B, the clamp configuration for assembling and separating the parcel tray 20, respectively, is composed of a receiving cover clamp 41 of the receiving box 30 and the receiving cover 40, and a luggage side clamp 51 of the receiving box 30 and the luggage side wall 50.

For example, the receiving cover clamp 41 is composed of a cover hook 41-1 and a cover insert 41-2. The cover hook 41-1 is composed of a hook groove 35 of the receiving box 30 and a cover fixer 41a of the receiving cover 40, and is disposed at the upper edge of the receiving box 30 on one side surface of the receiving cover 40. The cover insert 41-2 is composed of a boss groove 36 of the receiving box 30 and a cover boss 41b of the receiving cover 40, and is disposed from one side surface of the receiving cover 40 to the upper side surface of the receiving box 30.

In particular, the cover fixer 41a is an elastic rib type hook structure or a fastener structure, and the cover boss 41b is a flat rib type protrusion structure. In this case, it should be understood that the cover boss 41b may easily separate and mount the receiving cover 40 by using a certain degree of bending according to the flexible material characteristics of the receiving cover 40. However, since the receiving cover clamp 41 may sufficiently maintain the coupling force of the receiving cover 40 with respect to the receiving box 30 with the cover hook 41-1, the cover insert 41-2 may be removed.

For example, the luggage side clamp 51 is composed of a luggage side hook 51-1 and a luggage side positioner 51-2. The luggage side hook 51-1 is composed of a hook groove 35 of the receiving box 30 and a wall fixer 50a of the luggage side wall 50, and is disposed from the side surface of the luggage side wall 50 toward the side surface of the receiving box 30. The luggage side positioner 51-2 is composed of a boss groove 36 of the receiving box 30 and a wall boss 50b of the luggage side wall 50, and is disposed from the side surface of the luggage side wall 50 toward the side surface of the receiving box 30. Therefore, the luggage side hook 51-1 and the luggage side positioner 51-2 are formed in a pair to be spaced apart from each other.

In particular, the wall fixer 50a is an elastic rib type hook structure or a fastener structure, and the wall boss 50b is a flat rib type protrusion structure. However, since the luggage side clamp 51 sufficiently maintains the coupling force of the luggage side wall 50 with respect to the receiving box 30 with the luggage side hook 51-1, the luggage side positioner 51-2 may be removed. In addition, the luggage side clamp 51 may be assembled with the receiving box 30 by screwing or fusing, and in this case, the hook groove 35 and the boss groove 36 of the receiving box 30, and the wall fixer 50a and the wall boss 50b of the luggage side wall 50 are not required.

FIGS. 4 to 7 illustrate detailed structures of the receiving box 30, the luggage side wall 50, and the receiving shutter 60, respectively.

Figure 4:
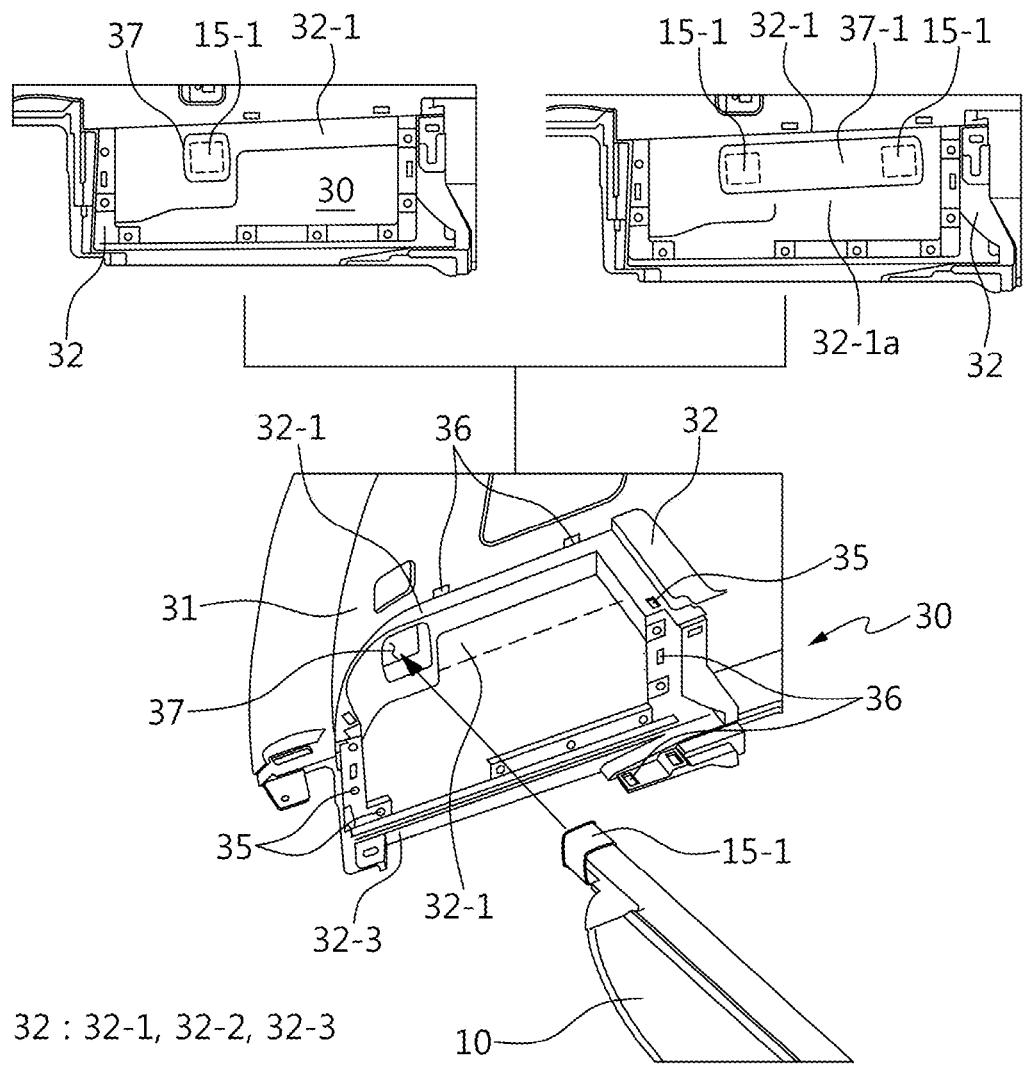
FIG. 4 is a diagram illustrating a detailed structure of the receiving box according to an exemplary embodiment the present disclosure.

Referring to FIG. 4, the receiving box 30 is composed of a receiving housing 31, a receiving frame 32, a cover positioner 33, a hook groove 35, a boss groove 36, and a cargo screen holder 37.

Specifically, the receiving housing 31 is formed by injection molding in a thin plate-shaped panel constituting the overall shape of the receiving box 30, and upon injection molding, the receiving box 30 is formed in an integral structure by forming the receiving frame 32, the cover positioner 33, the hook groove 35, the boss groove 36, and the cargo screen holder 37 together. In particular, the receiving housing 31 has the cover boss 41b of the receiving cover 40 constituting the cover insert 41-2 fitted therein by punching the boss groove 36 at an upper frame 32-1 of the receiving frame 32.

Specifically, the receiving frame 32 receives the receiving equipment 70 by constituting an edge to form the inner space of the receiving box 30 on the side surface of the receiving housing 31. For this purpose, the receiving frame 32 is divided into the upper frame 32-1 for attaching and detaching the receiving cover 40, a side frame 32-2 for attaching and detaching the luggage side wall 50, and a lower frame 32-3.

For example, the upper frame 32-1 is formed of the edge in a "L" shape to form the protruded upside edge of the rectangular edges of the receiving frame 32, thereby forming an interval with the cover positioner 33 at the bent portion in the "L" shape so that one side edge portion of the receiving cover 40 is fitted while forming the inner space where the receiving equipment 70 is received. In particular, the upper frame 32-1 has the cover hook 41-1 constituting the receiving cover clamp 41 fitted therein by punching the hook groove 35 at the bent portion in the "L" shape forming the interval with the cover positioner 33. The side frame 32-2 forms the left and right edges of the rectangular edges of the receiving frame 32.

In particular, the side frame 32-2 has the wall fixer 50a and the wall boss 50b constituting each of the luggage side hook 51-1 and the luggage side positioner 51-2 fitted therein by punching the hook groove 35 and the boss groove 36 in plural with an interval therebetween. The lower frame 32-3 forms the protruded lower side edge of the rectangular edges of the receiving frame 32, thereby forming the inner space where the receiving equipment 70 is received. In particular, the lower frame 32-3 has the hook groove 35 punched in plural with an interval therebetween if necessary, thereby reinforcing the lower fixing state of the luggage side wall 50 by a structure of fitting and coupling the receiving box 30 and the luggage side wall 50.

Specifically, the cover positioner 33 is integrally formed with the receiving housing 31 in the shape protruded at an interval from the side surface portion in the "L" shape of the upper frame 32-1 so that one side portion (i.e., the right portion in FIG. 4) of the left and right portions of the receiving cover 40 is fitted and fixed thereto in the state coupled with the receiving box 30.

Specifically, the cargo screen holder 37 is formed of a recessed groove on the "L"-shaped front portion (i.e., the opposite portion of the cover positioner 33) of the upper frame 32-1, and the recessed groove fits the roller bar end 15-1 formed on the roller bar 15 of the cargo screen 10 so that the cargo screen 10 is fixed in a state where the cargo is covered by rolling-out the cover sheet 11. In this case, the shape of the recessed groove is a square shape corresponding to the shape of the roller bar end 15-1, but may be variously modified according to various changes of the shape of the roller bar end 15-1.

In particular, the cargo screen holder 37 may be switched to the cargo screen holder rail 37-1. In this case, the cargo screen holder rail 37-1 is switched to a rail groove structure that is recessed lengthily in the longitudinal direction along the "L"-shaped front portion of the upper frame 32-1 instead of the square-shaped recessed groove. For this purpose, the upper frame 32-1 further forms an upper extension frame 32-1a for extending the width thereof, thereby preparing a space where the cargo screen holder rail 37-1 is formed.

Therefore, the cargo screen holder rail 37-1 may move the receiving position of the roller bar end 15-1 to the rear position (i.e., the position of the cover positioner 33) from the position of the cargo screen holder 37, and the rear position movement allows more cargo to be covered by making the size of the rolled-out cover sheet 11 larger when the cargo screen 10 is used.

Figure 5:
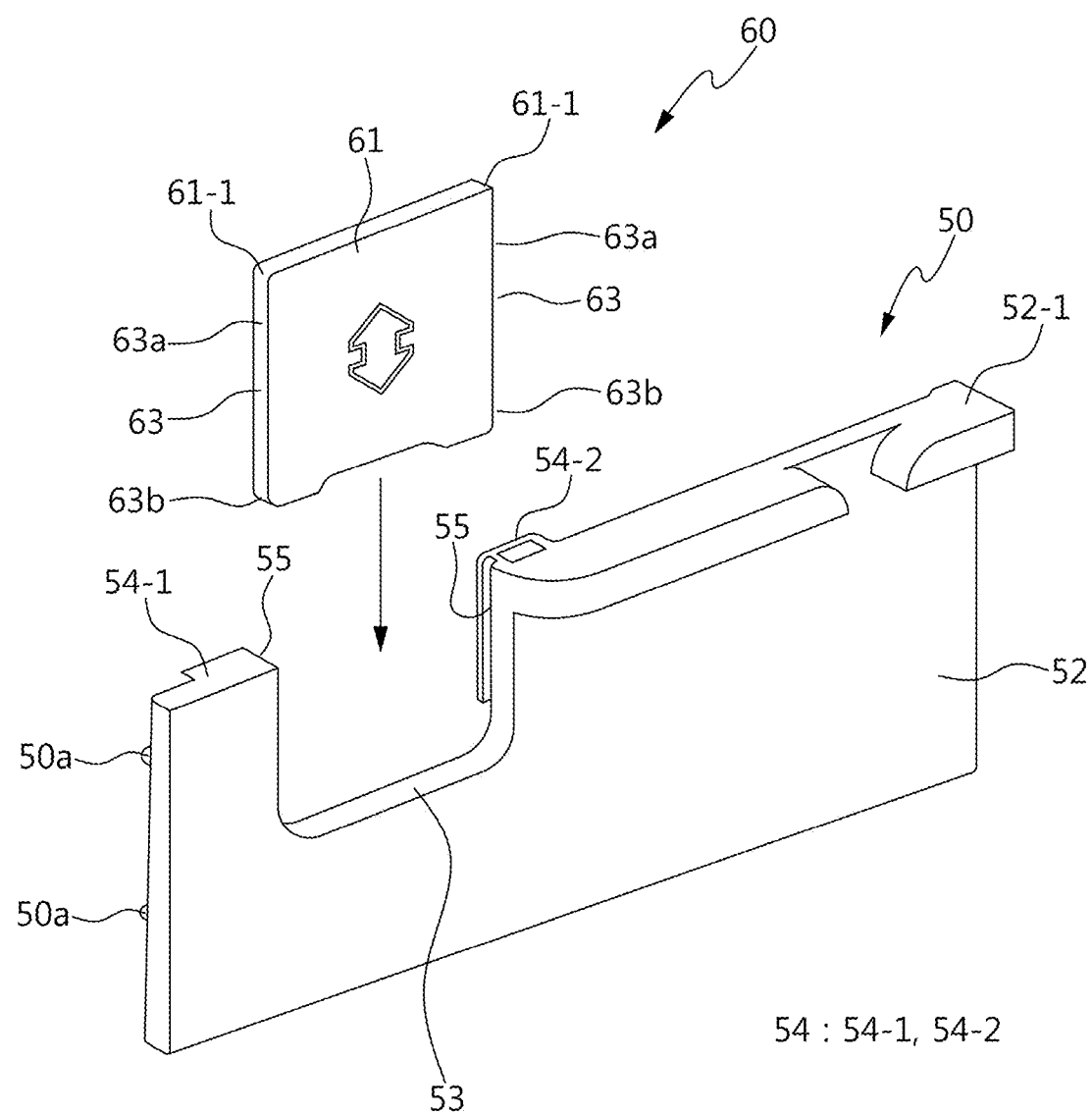
FIG. 5 is a configuration diagram of separating the luggage side wall and a receiving shutter according to an exemplary embodiment the present disclosure.

Referring to FIG. 5, the luggage side wall 50 and the receiving shutter 60 are separately manufactured, and then coupled and integrated.

Specifically, the luggage side wall 50 is composed of a wall body 52, a receiving shutter window 53, a receiving shutter guide 54, and a rib 57, and the wall fixer 50a and the wall boss 50b constituting the luggage side hook 51-1 and the luggage side positioner 51-2 of the luggage side clamp 51 are provided on one side surface (i.e., the surface facing the receiving box 30) of the wall body 52.

For example, the wall body 52 is made of a rectangular plate material having a predetermined thickness, and a wall flange 52-1, which is bent to be held by hand, is protruded from the upper portion excluding the receiving shutter window 53. The receiving shutter window 53 is formed in a "U" shape having a cut-out structure that has cut the upper portion of the wall body 52 in a predetermined size. The receiving shutter guide 54 is protruded from the one side surface (i.e., the surface facing the receiving box 30) of the wall body 52 and provided at the left and right sides of the receiving shutter window 53.

Therefore, the receiving shutter guide 54 is divided into a left receiving shutter guide 54-1 disposed at the left side of the receiving shutter window 53 and a right receiving shutter guide 54-2 disposed at the right side of the receiving shutter window 53. A guide channel 55 is recessed with a groove on each of the left receiving shutter guide 54-1 and the right receiving shutter guide 54-2 so that the receiving shutter 60 is fitted therein.

Specifically, the rib 57 is formed in plural in a lattice structure on one side surface (i.e., the surface facing the receiving box 30) of the wall body 52, thereby reinforcing the stiffness of the luggage side wall 50.

Specifically, the receiving shutter 60 functions as an inlet passage where the roller bar end 15-1 formed on the roller bar 15 of the cargo screen 10 is fitted into the cargo screen holder 37 or the cargo screen holder rail 37-1, thereby moving downwardly so that the receiving shutter window 53 is opened when the cargo screen 10 is received therein, while moving upwardly so that the receiving shutter window 53 is closed when the cargo screen is not received therein.

For example, the receiving shutter 60 is composed of a shutter body 61 and a guide flange 63. The shutter body 61 is made of a rectangular plate material having a predetermined thickness corresponding to the size and shape of the receiving shutter window 53, and a side flange 61-1 is protruded from one side surface of the upper portion thereof so that the receiving shutter 60 may be stably disposed in the receiving shutter guide 54. The guide flange 63 is protruded from the left and right surfaces of the shutter body 61 in the length of the shutter body 61 to be fitted in the left and right receiving shutter guides 54-1, 54-2 of the receiving shutter guide 54, thereby stably guiding the vertical movement (i.e., the opening and closing of the receiving shutter window 53) of the receiving shutter 60.

Figure 6:
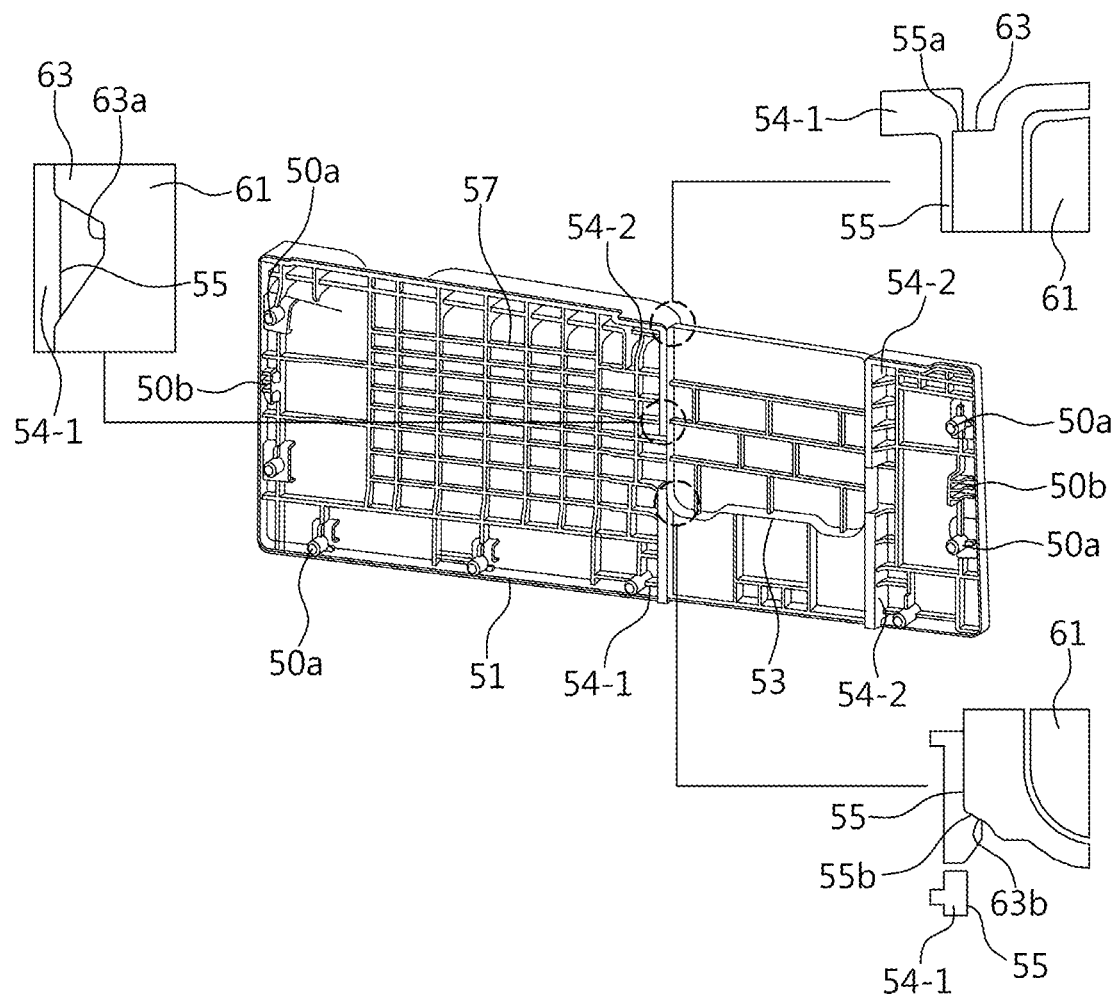
FIG. 6 is a diagram illustrating a state where the receiving shutter operated in a vertical movement has been assembled in the luggage side wall according to an exemplary embodiment the present disclosure.
Figure 7:
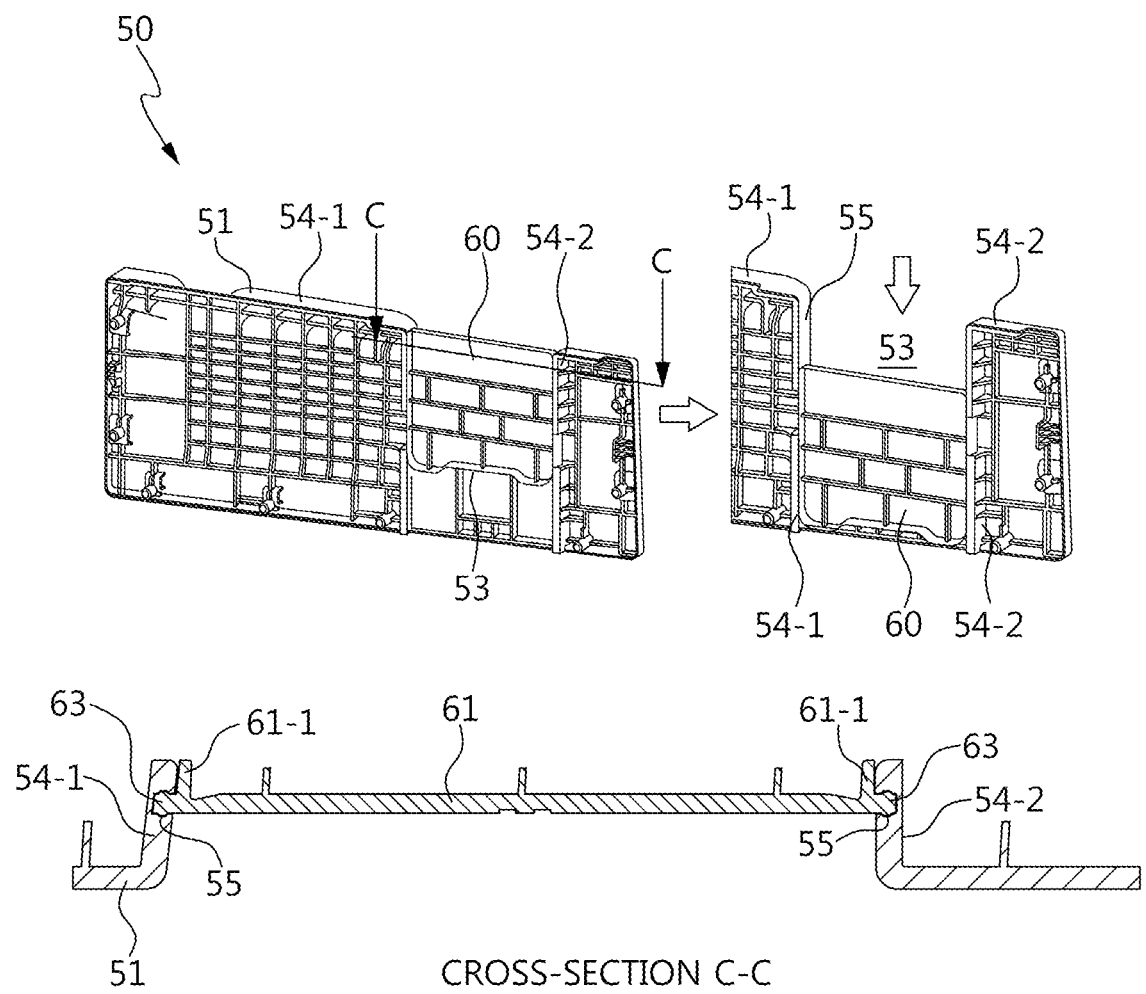
FIG. 7 is a cross-sectional diagram of assembling the luggage side wall and the receiving shutter according to an exemplary embodiment the present disclosure.

Referring to FIGS. 6 and 7, the coupling structure of the receiving shutter guide 54 and the guide flange 63 is exemplified. In this case, it should be understood that the coupling structure is assembled by using a certain degree of bending according to the flexible material characteristics of the luggage side wall 50 or the receiving shutter 60.

Referring to FIG. 6, the guide flange 63 of the receiving shutter 60 is fitted in the guide channel 55 formed in each of the left receiving shutter guide 54-1 and the right receiving shutter guide 54-2. In particular, the side flange 61-1 of the receiving shutter 60 is in close contact with the side surface of each of the left receiving shutter guide 54-1 and the right receiving shutter guide 54-2 by forming the "L" shape with the shutter body 61, thereby acting so that the assembled state of the receiving shutter 60 is stably maintained.

Therefore, when an external pressing force (see the arrow direction in FIG. 6) is applied to the receiving shutter 60, the guide flange 63 moves downwardly along the guide channel 55, thereby opening the inner space of the receiving box 30 to the outside with the opened position. On the other hand, when an external pushing-up force (see the direction opposite to the arrow in FIG. 6) is applied to the receiving shutter 60, the guide flange 63 is lifted upwardly along the guide channel 55, thereby blocking the inner space of the receiving box 30 from the outside with the closed position.

Referring to FIG. 7, the guide channel 55 forms a locking protrusion 55a and an inclined protrusion 55b. The guide flange 63 has a descending position groove 63a and an inclined surface end 63b.

In particular, the locking protrusion 55a forms the upper edge portion of the guide channel 55, while the inclined protrusion 55b forms the lower edge portion of the guide channel 55, thereby fixing the receiving shutter 60 assembled in the receiving shutter window 53 with the closed position.

In addition, the descending position groove 63a is formed with a cutting groove adjacent to the upper end of the guide flange 63 so that the receiving shutter 60 may be fixed at the opened position. In this case, the shape of the descending position groove 63a is engaged therewith by forming the uneven structure with the shape of the inclined protrusion 55b, thereby stably fixing the downward moving state of the receiving shutter 60.

On the other hand, the inclined surface end 63b is formed with an inclined surface at the lower edge portion of the guide flange 63, thereby reducing the frictional force of the receiving shutter 60 at the closed position so that the receiving shutter 60 may descend downwardly to the opened position even by using only a small pressing force. In this case, the inclined protrusion 55b and the inclined surface end 63b are formed at an acute angle, and 45° is particularly preferable.

Figure 8:
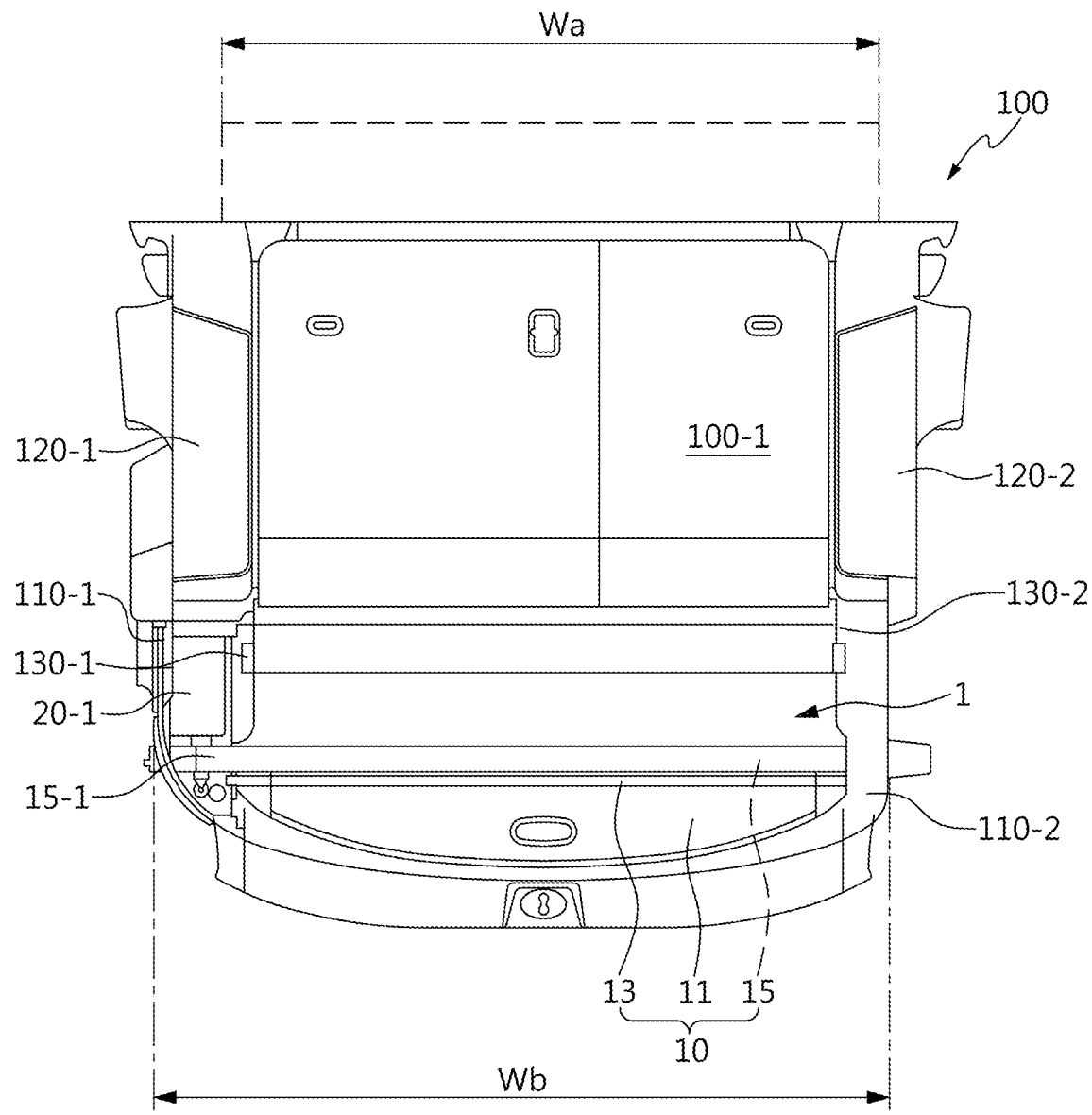
FIG. 8 is an example of the vehicle to which the side shutter receiving type cargo screen unit is applied according to an exemplary embodiment the present disclosure.
Figure 9:
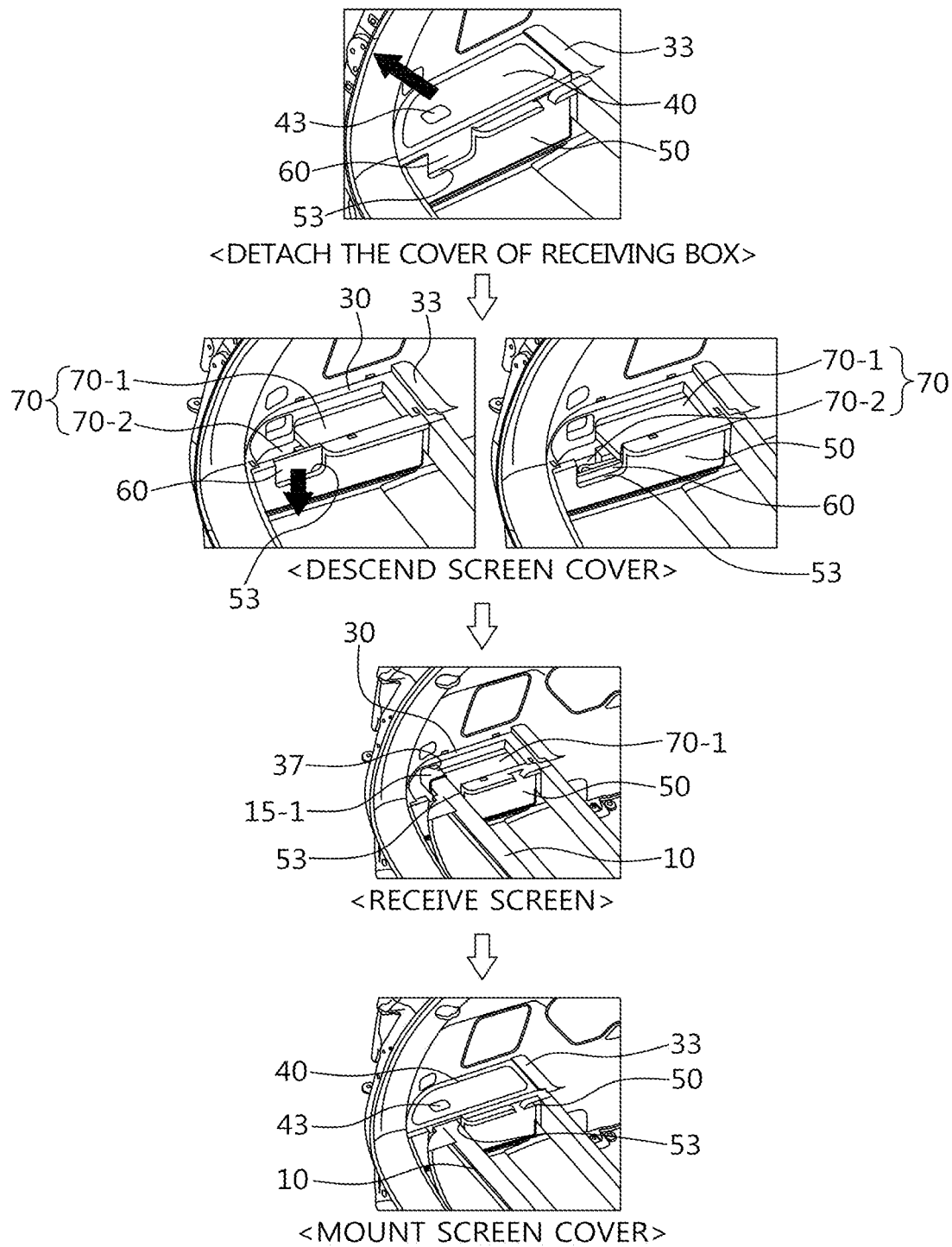
FIG. 9 is a diagram illustrating a procedure of receiving the cargo screen in the vehicle to which the side shutter receiving type cargo screen unit is applied according to an exemplary embodiment the present disclosure.
Figure 10:
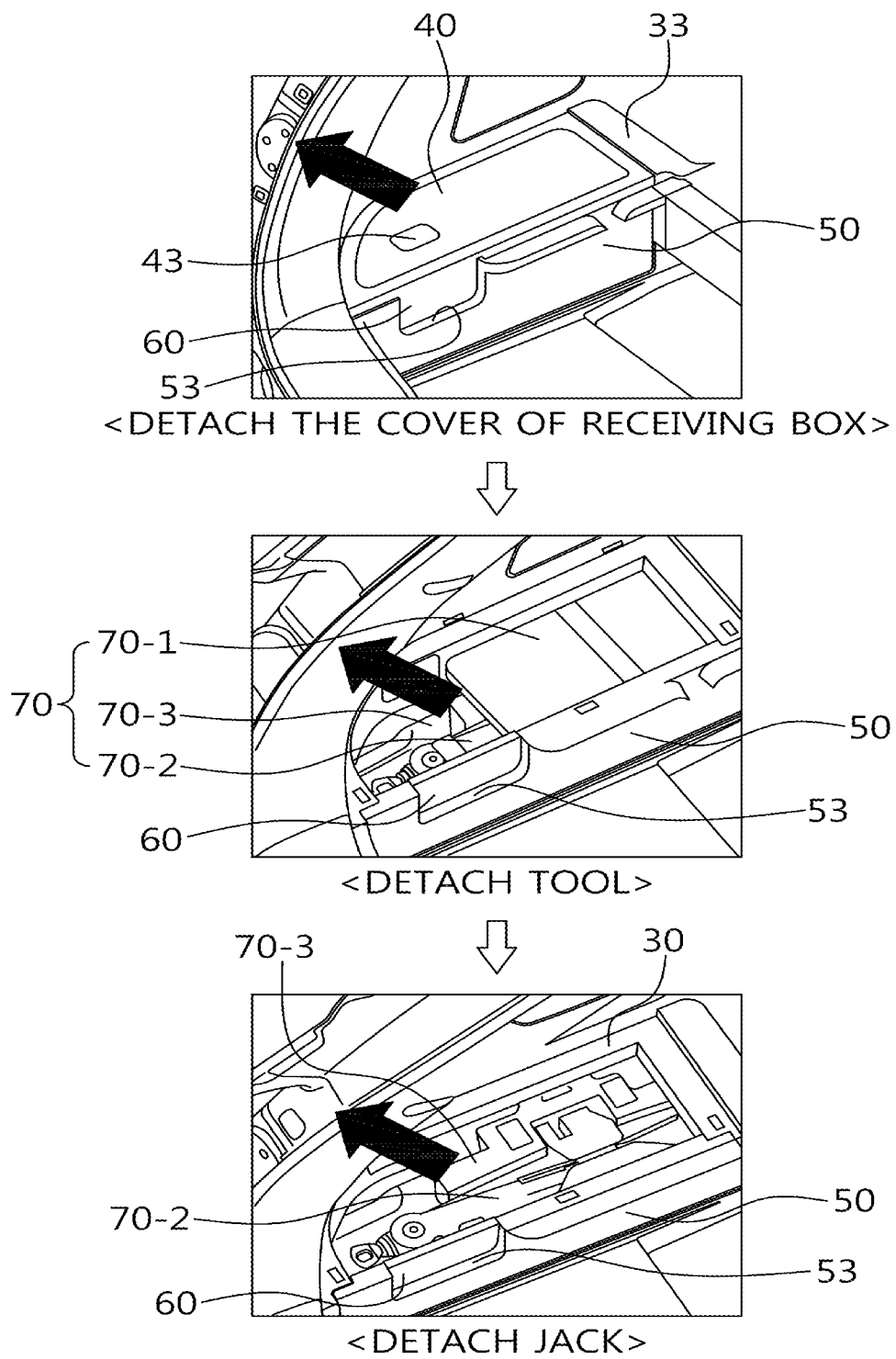
FIG. 10 is a diagram illustrating a procedure of using a tool and a jack in the vehicle to which the side shutter receiving type cargo screen unit is applied according to an exemplary embodiment the present disclosure.

FIGS. 8 to 10 illustrate an example of a vehicle 100 to which the cargo screen unit 1 is applied.

Referring to FIG. 8, the vehicle 100 has the cargo screen unit 1 in a trunk 100-1 in which a cargo is mounted in the rear of the vehicle.

Specifically, the cargo screen unit 1 is composed of the cargo screen 10 and the parcel tray 20 having a pair of the left and right parcel trays 20-1, 20-2, and is the same as the cargo screen unit 1 described through FIGS. 1 to 7. However, the cargo screen 10 is formed to have width Wb greater width Wa of the rear seat provided in the vehicle indoor, such that there is a difference in that it corresponds to the size of the width of the trunk 100-1.

Specifically, the trunk 100-1 forms a trunk space with the vehicle body outer trim panel 110 and the wheelhouse 120 connected thereto, and the side surfaces of the vehicle body outer trim panel 110 and the wheelhouse 120 are covered by the luggage side trim 130 in the trunk space.

For example, the vehicle body outer trim panel 110 forms an additional space in which the left and right parcel trays 20-1, 20-2 are respectively placed in the backward direction (i.e., the rear door direction opposite to the rear seat), and is composed of a left vehicle body outer trim panel 110-1 and a right vehicle body outer trim panel 110-2 constituting the left and right walls of the trunk 100-1.

The wheelhouse 120 may be protruded into the trunk space in the forward direction (i.e., the rear seat direction) to partition the additional space, and is divided into a left wheelhouse 120-1 and a right wheelhouse 120-2 constituting the left and right walls of the trunk 100-1.

The luggage side trim 130 may be divided into a left luggage side trim 130-1 welded or riveted to the side surfaces of the left vehicle body outer trim panel 110-1 and the left wheelhouse 120-1 in the trunk space, and a right luggage side trim 130-2 welded or riveted to the side surfaces of the right vehicle body outer trim panel 110-2 and the right wheelhouse 120-2, respectively.

Referring to FIG. 9, a state where the cargo screen 10 is stored and used in the trunk 100-1 of the vehicle 100 is illustrated.

In the operation of detaching the cover of the receiving box, the coupling of the cover hook 41-1 and the cover insert 41-2 of the receiving cover clamp 41 is separated by lifting the receiving cover 40 by using the grip member 43 of the receiving cover 40 in the opened state of the trunk 100-1, and then the receiving cover 40 is separated from the receiving box 30 by pulling out the receiving cover 40 fitted between the upper frame 32-1 of the receiving frame 32 and the cover positioner 33. In this case, the cover boss 41b of the cover insert 41-2 may easily separate the receiving box 30 and the receiving cover 40 by using a certain degree of bending according to the flexible material characteristics of the receiving cover 40.

In the operation of descending the screen cover, the guide flange 63 of the receiving shutter 60 moves downwardly along the guide channel 55 of the luggage side wall 50 by pressing downwardly the receiving shutter 60 assembled in the receiving shutter window 53 of the luggage side wall 50. In this case, the surface contact state of the inclined protrusion 55b of the guide channel 55 and the inclined surface end 63b of the guide flange 63 is displaced by the pressing force that presses downwardly the receiving shutter 60, such that the receiving shutter 60 may descend downwardly. Then, the descending position groove 63a of the guide flange 63 is disposed on the inclined protrusion 55b of the guide channel 55 by further pressing downwardly the receiving shutter 60.

Then, the receiving shutter 60 is fixed in position in a state where the pressing force is not applied by the engagement of the uneven structure of the inclined protrusion 55b and the descending position groove 63a to be switched to the state where the receiving shutter window 53 of the luggage side wall 50 is opened. As a result, the recessed groove of the cargo screen holder 37 formed on the upper frame 32-1 of the receiving box 30 or the rail groove of the cargo screen holder rail 37-1 may be exposed to the outside and visually confirmed.

In the screen receiving operation, the roller bar end 15-1 of the roller bar 15 is fitted into the recessed groove of the cargo screen holder 37 or the rail groove of the cargo screen holder rail 37-1 after the cargo screen 10 is disposed in the open space of the receiving box 30. This operation is performed in each of the left parcel tray 20-1 and the right parcel tray 20-2. Then, the cargo screen 10 is received in the parcel tray 20.

In the operation of mounting the cover of the receiving box, one side edge portion of the receiving cover 40 is fitted between the upper frame 32-1 of the receiving frame 32 and the cover positioner 33, and then by pressing downwardly the receiving cover 40, the cover fixer 41a of the cover hook 41-1 is fitted into the hook groove 35 of the receiving box 30 and the cover boss 41b of the cover insert 41-2 is fitted into the boss groove 36 of the receiving box 30. In this case, the cover boss 41b may easily fit the cover boss 41b into the boss groove 36 by using a certain degree of bending according to the flexible material characteristics of the receiving cover 40.

As a result, the cargo screen 10 may be kept in a neat state where the aesthetic appearance due to the external exposure is not reduced by covering it with the receiving cover 40 in a state where the roller bar end 15-1 has been received in the parcel tray 20. Then, the cover sheet 11 of the cargo screen 10 is pulled out and rolled out from the roller assembly 13 to cover the cargo loaded in the trunk 100-1, and the ring or the groove portion of the cover sheet 11 is locked on the panel protrusion of the trunk 100-1 or fitted into the panel groove to be switched to the fixed state.

On the other hand, referring to FIG. 10, a state where the receiving equipment 70 is used in the trunk 100-1 of the vehicle 100 is illustrated.

Since the operation of detaching the cover of the receiving box for using the receiving equipment 70 is the same as the operation of detaching the cover of the receiving box for using the cover screen 10 of FIG. 9, a description thereof will be omitted. Then, in the operation of detaching the tool, the tool 70-1 tied with the holder 70-3 by a string is removed. Subsequently, in the operation of detaching the jack, the jack 70-2 is taken out from the holder 70-3. As described above, the operation of detaching the tool 70-1 or the jack 70-2 may be performed simply only by detaching the receiving cover 40 for blocking the external exposure of the receiving equipment 70.

FIGS. 11A, 11B, 12, and 13 illustrate an example in which the cargo screen unit 1 is integrated by using the panel of the vehicle 100.

Figure 11A:
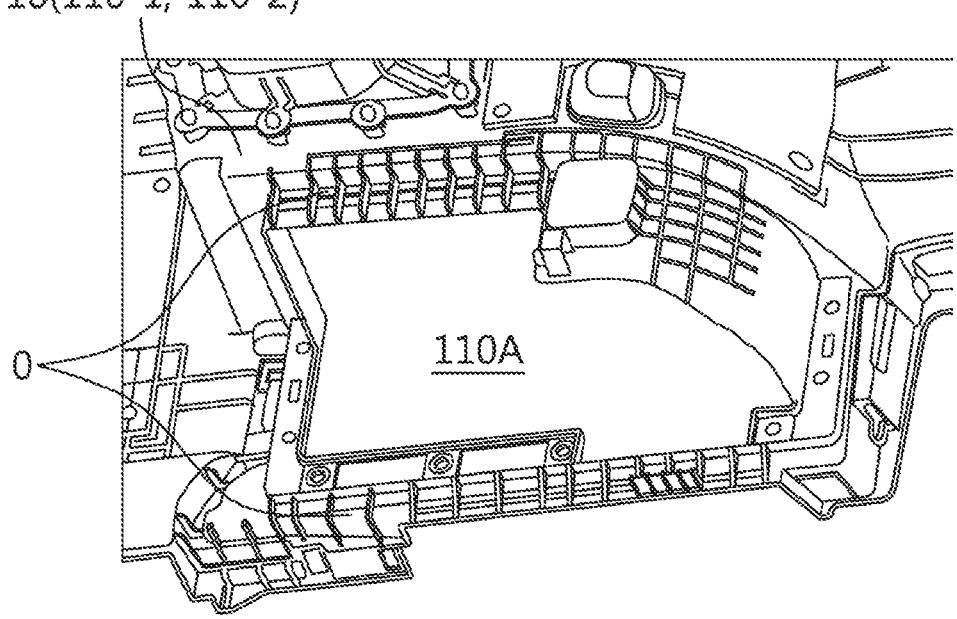
FIGS. 11A and 11B are diagrams illustrating an example of a luggage side trim replacing the receiving cover, the luggage side wall, and the receiving shutter together with a vehicle body outer trim panel replacing the receiving box of the parcel tray according to an exemplary embodiment the present disclosure.
Figure 11B:
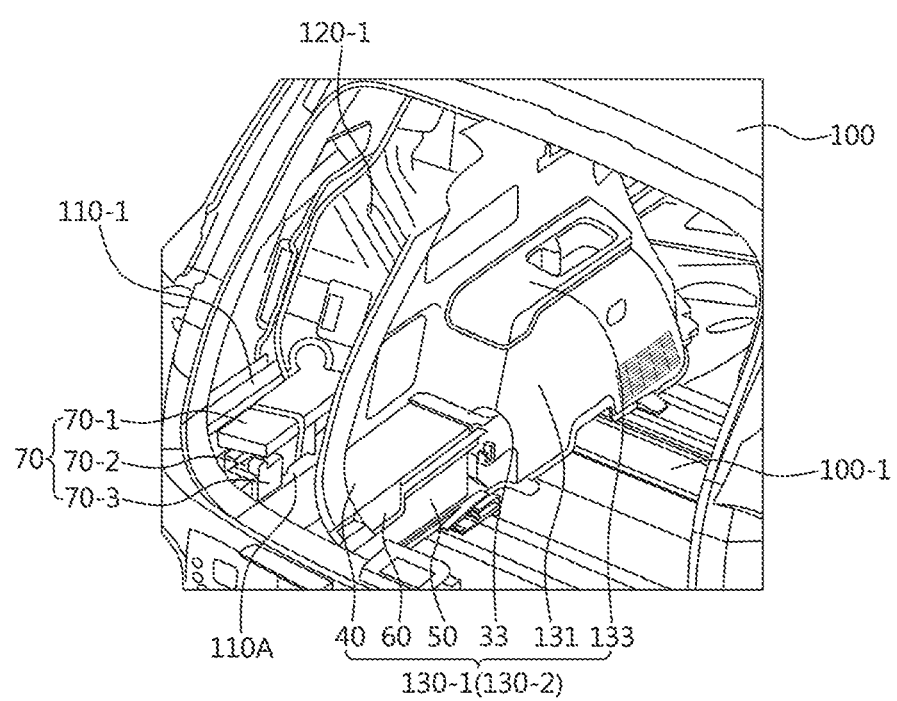

Referring to the vehicle body outer trim panel 110 of FIGS. 11A and 11B, the vehicle body outer trim panel 110 is composed of the left vehicle body outer trim panel 110-1 and the right vehicle body outer trim panel 110-2.

Therefore, each of the left vehicle body outer trim panel 110-1 and the right vehicle body outer trim panel 110-2 forms the rear portions of the left wheelhouse 120-1 and the right wheelhouse 120-2 as a left additional space and a right additional space, and each of the left and right additional spaces forms a parcel tray space 110A replacing the inner space formed by the receiving housing 31 and the receiving frame 32 of the receiving box 30 constituting the parcel tray 20. As a result, each of the left vehicle body outer trim panel 110-1 and the right vehicle body outer trim panel 110-2 is formed in an integrated structure with the receiving box 30.

In particular, although each of the left vehicle body outer trim panel 110-1 and the right vehicle body outer trim panel 110-2 has not been illustrated, the cover positioner 33, the hook groove 35, the boss groove 36, and the cargo screen holder 37 or the cargo screen holder rail 37-1 of the receiving box 30 may also be integrally formed through a molding process.

Referring to the luggage side trim 130 of FIG. 11, the luggage side trim 130 is composed of the left luggage side trim 130-1 and the right luggage side trim 130-2. Therefore, each of the left luggage side trim 130-1 and the right luggage side trim 130-2 is formed in an integrated structure with the luggage side wall 50 constituting the parcel tray 20.

In particular, each of the left luggage side trim 130-1 and the right luggage side trim 130-2 may also have the wall fixer 50a of the luggage side hook 51-1 and the wall boss 50b of the luggage side positioner 51-2 integrally formed together with the coupling structure of the receiving cover 40 and the receiving shutter 60 through the molding process.

Figure 12:
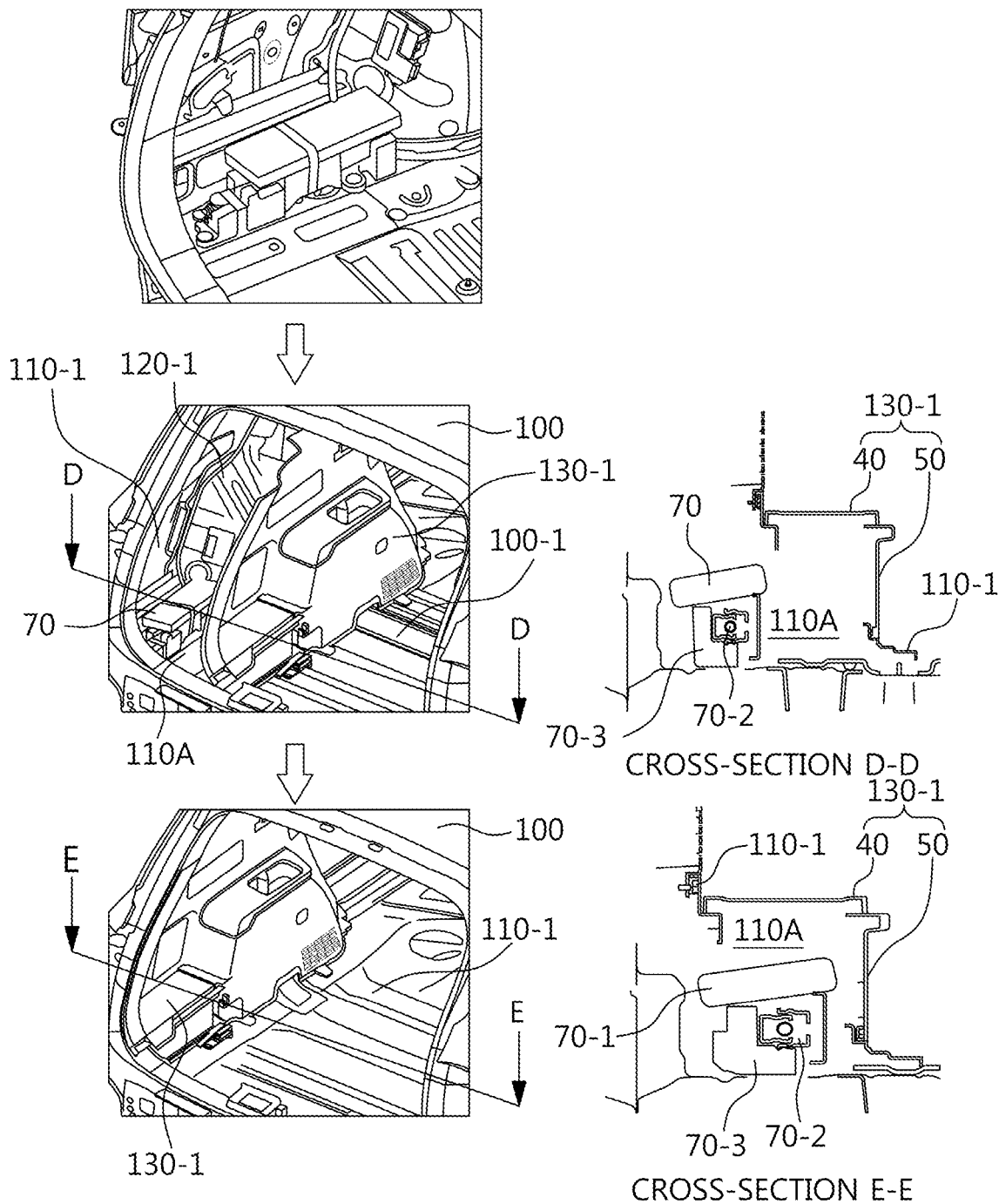
FIG. 12 is a diagram illustrating a state where the side shutter receiving type cargo screen unit is formed in the vehicle trunk by using the vehicle body outer trim panel and the luggage side trim according to an exemplary embodiment the present disclosure.

Referring to FIG. 12, the receiving equipment 70 is placed in the parcel tray space 110A of the left vehicle body outer trim panel 110-1. Then, the left luggage side trim 130-1 is added and welded to the side surface portions of the left vehicle body outer trim panel 110-1 and the left wheelhouse 120-1, or is clamp-coupled by using the wall fixer 50a of the luggage side hook 51-1 and the wall boss 50b of the luggage side positioner 51-2.

As a result, the left vehicle body outer trim panel 110-1 covers the left vehicle body outer trim panel 110-1 and the left wheelhouse 120-1 to maintain a clean appearance. In particular, the left vehicle body outer trim panel 110-1 has the receiving cover 40 and the receiving shutter 60 disposed in the parcel tray space 110A of the left vehicle body outer trim panel 110-1. Therefore, the cargo screen 10 may be easily received in the parcel tray space 110A through the detachment of the receiving cover 40 and the descent of the receiving shutter 60.

In this case, the operating process of the right luggage side trim 130-2 with respect to the right vehicle body outer trim panel 110-2 is similar to the operating process of the left luggage side trim 130-1 with respect to the left vehicle body outer trim panel 110-1.

Figure 13:
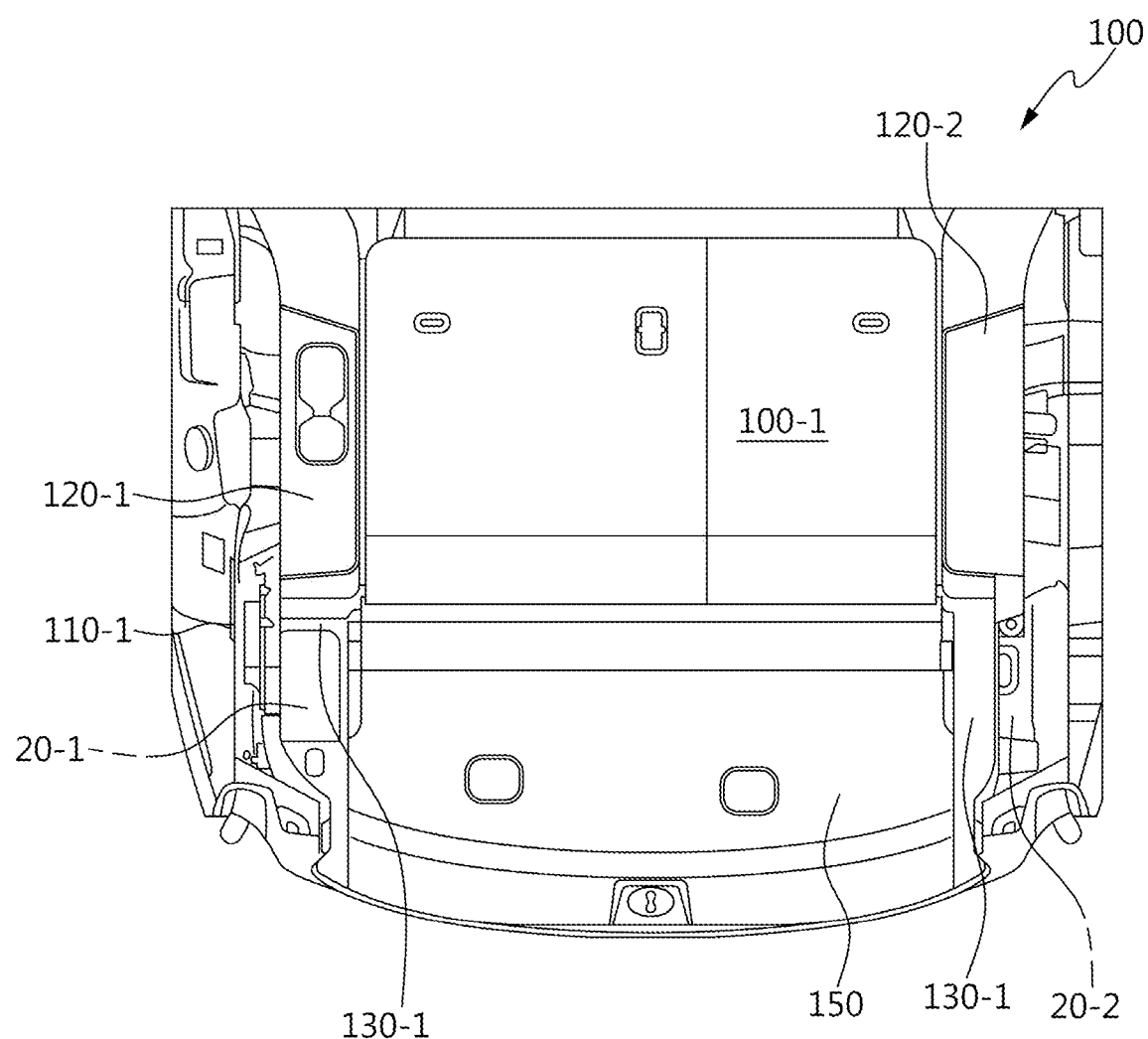
FIG. 13 is a diagram illustrating an example in which a luggage tray is used when the cargo screen is not used in order to increase the usability of the upper space of the trunk according to an exemplary embodiment the present disclosure.

Referring to FIG. 13, an example of using the cargo screen 10 and a luggage tray 150 is illustrated.

As illustrated, the left and right edge portions of the cargo screen 10 are received in the parcel tray space 110A of the left and right vehicle body outer trim panels 110-1, 110-2 so that the roller bar end 15-1 is covered by the left and right luggage side trims 130-1, 130-2 and at the same time, the cover sheet 11 rolled out on the luggage tray 150 is covered thereby. Therefore, the trunk 100-1 may greatly increase the usability of the upper space (i.e., the rear seat direction) of the trunk without damaging the aesthetic appearance by the luggage tray 150 covering the cargo screen 10.

As described above, the side shutter receiving type cargo screen unit 1 applied to the trunk 100-1 of the vehicle 100 according to an exemplary embodiment of the present embodiment includes the parcel tray 20 composed of the receiving box 30 forming the inner space in which the edge portion of the cargo screen 10 having the cover sheet 11 is received, the receiving cover 40 coupled to the upper portion of the receiving box 30 and for covering the upper surface of the inner space, the luggage side wall 50 coupled to the side surface of the receiving box 30 and for covering the side surface of the inner space, and the receiving shutter 60 coupled to the luggage side wall 50 and operated in a vertical movement type shutter manner for opening and closing the inner space.

As a result, the side shutter receiving type cargo screen unit 1 may prevent the receiving portion from being exposed to the outside due to the size of the width of the cargo screen 10 without reducing the aesthetic appearance, thereby increasing the space usability of the trunk 100-1 by using the luggage tray 150, and in particular, may also adjust the cargo screen corresponding to the size of the cargo by moving the receiving position of the cargo screen along the side surface of the parcel tray without requiring to disassemble the luggage side trim and reduce the size of the inlet of the receiving box for receiving the cargo screen. That is, the side shutter receiving type cargo screen unit 1 according to the present disclosure removes all disadvantages such as limiting the size of the width of the cargo screen 10, disassembling the luggage side trim, and reducing the size of the inlet of the receiving box compared to the conventional structure, and moves the receiving position of the cargo screen corresponding to the size of the cargo and prevents the external exposure of the receiving portion of the cargo screen 10 when using the luggage tray 150, thereby increasing the space usability of the trunk 100-1.

What is claimed is:

1. A cargo screen unit, comprising:
   a cargo screen having a cover sheet rolled out from a rolled-in and wound state so as to cover a cargo; and
   a parcel tray having an inner space for receiving an edge portion of the cargo screen, and having a receiving shutter, which communicates the inner space and an outer space by a downward movement and blocks the inner space and the outer space by an upward movement.

2. The cargo screen unit of claim 1, wherein the parcel tray comprises:
   a receiving box forming the inner space;
   a receiving cover coupled to an upper portion of the receiving box to cover an upper surface of the inner space; and
   a luggage side wall coupled to a side surface of the receiving box to cover a side surface of the inner space, and having a receiving shutter window to which the receiving shutter is coupled.

3. The cargo screen unit of claim 2,
   wherein a coupling structure of the luggage side wall and the receiving shutter includes a guide channel of the luggage side wall and a guide flange of the receiving shutter.

4. The cargo screen unit of claim 3,
   wherein the guide channel is located in a receiving shutter guide of the receiving shutter window, and
   wherein the receiving shutter guide protrudes to left and right edge portions of the receiving shutter window and configuring the guide channel.

5. The cargo screen unit of claim 4,
   wherein the guide channel includes an inclined protrusion and the guide flange includes an inclined surface end, and
   wherein the inclined protrusion and the inclined surface end keep the receiving shutter in a state where the inner space and the outer space is blocked after the upward movement.

6. The cargo screen unit of claim 5,
   wherein the guide flange further includes a descending position groove which keeps the receiving shutter in a state where the inner space and the outer space communicate after the downward movement by engaging with the inclined protrusion.

7. The cargo screen unit of claim 2,
   wherein the receiving box and the receiving cover are configured to be attached to and detached from a cover hook, and
   wherein the cover hook includes a hook groove of the receiving box and a cover fixer of the receiving cover.

8. The cargo screen unit of claim 2,
   wherein the receiving box and the luggage side wall are configured to be attached to and detached from a luggage side hook which includes a hook groove of the receiving box and a wall fixer of the luggage side wall.

9. The cargo screen unit of claim 2,
   wherein the receiving cover has a grip member which is configured to grip and pull the receiving cover so that the receiving cover is detached from the receiving box.

10. The cargo screen unit of claim 1,
    wherein the inner space has a cargo screen holder in a recessed groove of the inner space, and
    wherein the cargo screen holder fits the edge portion of the cargo screen on an upper portion of a receiving equipment received in the inner space to fix the cargo screen thereto.

11. The cargo screen unit of claim 1,
    wherein the inner space has a cargo screen rail holder which moves a position of the cargo screen in a state of fitting the edge portion of the cargo screen.

12. The cargo screen unit of claim 11,
    wherein the cargo screen rail holder includes a rail groove along a longitudinal direction of the parcel tray.

13. A vehicle, comprising:
    a parcel tray including:
       a receiving box formed as an inner space for receiving an edge portion of a cargo screen;
       a receiving cover coupled to an upper portion of the receiving box to cover an upper surface of the inner space;
       a luggage side wall coupled to a side surface of the receiving box to cover a side surface of the inner space; and
       a receiving shutter coupled to the luggage side wall to be operated in a vertical movement type shutter manner that opens and closes the inner space; and a trunk for forming the parcel tray as a pair of a left parcel tray and a right parcel tray, and arranging the left parcel tray as a left additional space of a left side of a cargo space and the right parcel tray as a right additional space of a right side of the cargo space.

14. The vehicle of claim 13,
wherein a left addition space is formed of a left vehicle body outer trim panel connected to a rear side of a left wheelhouse, and a right addition space is formed of a right vehicle body outer trim panel connected to a rear side of a right wheelhouse.

15. The vehicle of claim 14,
wherein each of the left vehicle body outer trim panel and the right vehicle body outer trim panel is in an integrated structure forming the receiving box, and
wherein the integrated structure forms the inner space as a parcel tray space.

16. The vehicle of claim 14,
wherein the left wheelhouse and the left vehicle body outer trim panel are combined to a left luggage side trim, and
the right wheelhouse and the right vehicle body outer trim panel are combined to a right luggage side trim.

17. The vehicle of claim 16,
wherein each of the left luggage side trim and the right luggage side trim is in an integrated structure forming the luggage side wall.

18. The vehicle of claim 13,
wherein the inner space receives a receiving equipment which comprises a jack.

19. The vehicle of claim 13,
wherein a luggage tray is interposed between the left additional space and the right additional space, and the luggage tray is received in the parcel tray to cover the cargo screen configured to cover a cargo.

* * * * *